United States Patent
Inuzuka

(10) Patent No.: US 9,562,320 B2
(45) Date of Patent: Feb. 7, 2017

(54) DYEING BASE BODY, METHOD FOR PRODUCING DYED RESIN BODY, AND METHOD FOR PRODUCING DYEING BASE BODY

(71) Applicant: NIDEK CO., LTD., Gamagori-shi, Aichi (JP)

(72) Inventor: Minoru Inuzuka, Nishio (JP)

(73) Assignee: NIDEK CO., LTD., Gamagori-shi (JP)

( * ) Notice: Subject to any disclaimer, the term of this patent is extended or adjusted under 35 U.S.C. 154(b) by 2 days.

(21) Appl. No.: 14/528,134

(22) Filed: Oct. 30, 2014

(65) Prior Publication Data

US 2015/0113743 A1   Apr. 30, 2015

(30) Foreign Application Priority Data

Oct. 31, 2013   (JP) ................. 2013-226154

(51) Int. Cl.
*B41M 5/41* (2006.01)
*B41M 5/46* (2006.01)
(Continued)

(52) U.S. Cl.
CPC ......... *D06P 5/004* (2013.01); *B29D 11/00038* (2013.01); *B29D 11/00894* (2013.01);
(Continued)

(58) Field of Classification Search
CPC ......... B41M 3/00; B41M 3/003; B41M 5/382; B41M 5/38214; B41M 5/40; B41M 5/41; B41M 5/42; B41M 5/426; B41M 5/44; B41M 5/46; B41M 5/50; B41M 5/504; B41M 5/508; B41M 5/52; B41M 2205/02; B41M 2205/10; B41M 2205/30; D06P 1/0044; D06P 5/00; D06P 5/004; G02B 1/04; G02B 1/043; B29D 11/00; B29D 11/00038; B29D 11/00903; Y10T 428/31623; Y10T 428/31721
(Continued)

(56) References Cited

U.S. PATENT DOCUMENTS 4,022,649 A  *  5/1977  Nakagome ................. C09J 5/06
                                                           156/182
6,520,999 B1     2/2003  Kamata et al.
(Continued)

FOREIGN PATENT DOCUMENTS

EP      2 284 312 A1    2/2011
JP      A-2001-59950    3/2001
JP      A-2011-48340    3/2011

OTHER PUBLICATIONS

Mar. 23, 2015 Extended Search Report issued in European Application No. 14 19 1160.2.

*Primary Examiner* — Bruce H Hess
(74) *Attorney, Agent, or Firm* — Oliff PLC

(57) ABSTRACT

A dyeing base body to be used in a dyeing step of dyeing a resin body by heating a sublimable dye attached to the dyeing base body by electromagnetic waves to sublime the dye toward the resin body. The dyeing base body includes a metal base made in sheet form and an electromagnetic wave absorption layer formed on at least an opposite side to the side to which the dye will be attached. The electromagnetic wave absorption layer has a higher electromagnetic wave absorption rate than the base.

10 Claims, 5 Drawing Sheets

(51) Int. Cl.
  *B29D 11/00* (2006.01)
  *D06P 5/28* (2006.01)
  *B41M 5/382* (2006.01)
  *B41M 5/50* (2006.01)
  *B41M 3/00* (2006.01)
  *B41M 5/44* (2006.01)
  *B41M 5/52* (2006.01)

(52) U.S. Cl.
  CPC ....... *B29D 11/00903* (2013.01); *B41M 3/003* (2013.01); *B41M 5/382* (2013.01); *B41M 5/38214* (2013.01); *B41M 5/41* (2013.01); *B41M 5/44* (2013.01); *B41M 5/506* (2013.01); *B41M 5/52* (2013.01); *B41M 5/46* (2013.01); *B41M 2205/02* (2013.01); *B41M 2205/10* (2013.01); *B41M 2205/30* (2013.01)

(58) Field of Classification Search
  USPC .................... 503/227; 8/471; 428/458, 474.4
  See application file for complete search history.

(56) References Cited

U.S. PATENT DOCUMENTS

| | | |
|---|---|---|
| 2003/0098906 A1 | 5/2003 | Randen et al. |
| 2006/0046197 A1 | 3/2006 | Kim et al. |
| 2011/0126364 A1 | 6/2011 | Mishina et al. |

\* cited by examiner

FIG. 4

<EVALUATION OF DYEING BASE BODY BEFORE DYEING>

| CONDITIONS | SUBJECT TO BE EVALUATED | EVALUATION DETAILS |
|---|---|---|
| No. 1 | State of Holding layer | No Holding Layer |
| No Holding Layer | State of Ink | Ink flowed and came into a nonuniform state |
| No. 2 | State of Holding layer | In the form of droplets adhered in spots |
| (PEG1000) | State of Ink | Ink flowed and came into a nonuniform state |
| No. 3 | State of Holding layer | Finely applied |
| (ND-1) | State of Ink | Partly blurred |
| No. 4 | State of Holding layer | With some linear unevenness |
| (PEO-1) | State of Ink | With dots almost maitained |
| No. 5 | State of Holding layer | With large linear unevenness |
| (PEO-8) | State of Ink | Blurred in large range |

FIG. 5

<EVALUATION OF PLASTIC LENS AFTER DYEING>

| CONDITIONS | Tv | L* | a* | b* | Evaluation Details |
|---|---|---|---|---|---|
| No. 3 (ND-1) | 43.29 | 71.75 | −22.90 | −38.05 | No color unevenness Something attached on lens surface |
| No. 4 (PEO-1) | 43.77 | 72.08 | −22.03 | −38.74 | No color unevenness Finely dyed |
| No. 5 (PEO-8) | 43.27 | 71.74 | −21.96 | −39.01 | No color unevenness Finely dyed |
| Paper (Comparative Example) | 49.42 | 75.71 | −21.26 | −32.78 | No color unevenness Slight impure substance on lens surface |

DYEING BASE BODY, METHOD FOR PRODUCING DYED RESIN BODY, AND METHOD FOR PRODUCING DYEING BASE BODY

CROSS-REFERENCE TO RELATED APPLICATIONS

This application is based upon and claims the benefit of priority from the prior Japanese Patent Applications No. 2013-226154 filed on Oct. 31, 2013, the entire contents of which are incorporated herein by reference.

BACKGROUND

This disclosure relates to a dyeing base body to be used in a vapor deposition transfer dyeing process, a method for producing a dyed resin body using the dyeing base body, and a method for producing the dyeing base body.

Conventionally, various techniques have been proposed for dyeing a resin body (e.g., a plastic lens). For instance, in a vapor deposition transfer dyeing method disclosed in Patent document 1, a sublimable dye attached or adhered to a dyeing base body is heated and then the heated sublimable dye is deposited on a resin body. Patent Document 2 teaches the use of inorganic material (e.g., glass), organic material (e.g., paper), and metal material (e.g., aluminum) as the material of a dyeing base body.

RELATED ART DOCUMENTS

Patent Documents

Patent Document 1: JP-A-2001-59950
Patent Document 1: JP-A-2011-48340

SUMMARY

In a conventional dyeing base body, it would be difficult to readily enhance the quality and the efficiency of vapor deposition transfer dyeing. When paper is used as the dyeing base body, for instance, the sublimable dye attached to one surface of the dyeing base body may strike or pass through to its opposite surface, resulting in a problem with non-uniform dyeing quality. Alternatively, when glass and metal material are used as the dyeing base body, the efficiency of heating the sublimable dye is decreased as compared with the case of using paper.

This disclosure is directed to provide a dyeing base body, a method for producing a dyed resin body, and a method for producing the dyeing base body to enhance both the quality and the efficiency of vapor deposition transfer dyeing.

A dyeing base body provided as a typical aspect is a dyeing base body to which a sublimable dye will be attached, the dyeing base body including: a metal base made in sheet form; and an electromagnetic wave absorption layer formed on at least an opposite side to a surface to which the dye will be attached, the electromagnetic wave absorption layer having a higher electromagnetic wave absorption rate than the base, wherein the dye attached to the dyeing base body is to be sublimed by heating by electromagnetic waves toward a resin body and deposited on the resin body.

A method for producing a dyed resin body provided as a typical aspect includes: a placement step of placing a dyeing base body under vacuum, the dyeing base body including a metal base made in sheet form and an electromagnetic wave absorption layer having a higher electromagnetic wave absorption rate than the base, the dyeing base body being attached with a sublimable dye, so that a surface of the dyeing base body to which the dye is attached is opposed to a resin body; a depositing step of irradiating electromagnetic waves to the electromagnetic wave absorption layer of the dyeing base body placed in the placement step to heat the dye, thereby causing the dye to sublime toward the resin body; and a fixation step of heating the resin body attached with the dye in the depositing step to fix the dye to the resin body.

A method for producing a dyeing base body provided as a typical aspect includes: a dye layer forming step of forming a dye layer containing a dye on a base body including a metal base made in sheet form and an electromagnetic wave absorption layer formed on at least one surface of the base, the electromagnetic wave absorption layer having a higher electromagnetic wave absorption rate than the base, wherein, in the dye layer forming step, the dye layer is formed so that the electromagnetic wave absorption layer is disposed on at least an opposite surface to the dye layer.

With the techniques according to the present disclosure, both the quality and the efficiency of vapor deposition transfer dyeing can be enhanced.

BRIEF DESCRIPTION OF THE DRAWINGS

FIG. 4 is a table showing estimation results on dyeing base bodies before a dyeing process;
and
FIG. 5 is a table showing estimation results on plastic lenses after the dyeing process.

DETAILED DESCRIPTION OF THE EXEMPLARY EMBODIMENTS

Schematic Configuration of Dyeing System

An embodiment which is one of typical embodiments of this disclosure will be explained below referring to accompanying drawings. The following explanation shows an example of dyeing a plastic lens 8 which is one example of a resin body by a vapor deposition transfer dyeing method to produce a dyed plastic lens. However, the technique exemplified below is also applicable to the case of dyeing any resin body (e.g., cell-phone covers, light-fitting covers, accessories, toys, etc.) other than the plastic lens 8 by the vapor deposition transfer dyeing method to produce a dyed resin body.

According to the embodiment, for example, it is possible to dye the plastic lens 8 made of highly refractive material such as polycarbonate-based resin (e.g., diethylene glycol bis-allyl carbonate polymer (CR-39)), polyurethane-based resin, allyl-based resin (e.g., allyl diglycol carbonate and its copolymer, diallyl phthalate and its copolymer), fumarate-based resin (e.g., benzyl fumarate copolymer), stylene-based resin, polymethyl acrylate-based resin, fiber-based resin (e.g., cellulose propionate), thiourethane-based or thioepoxy.

Figure 1:
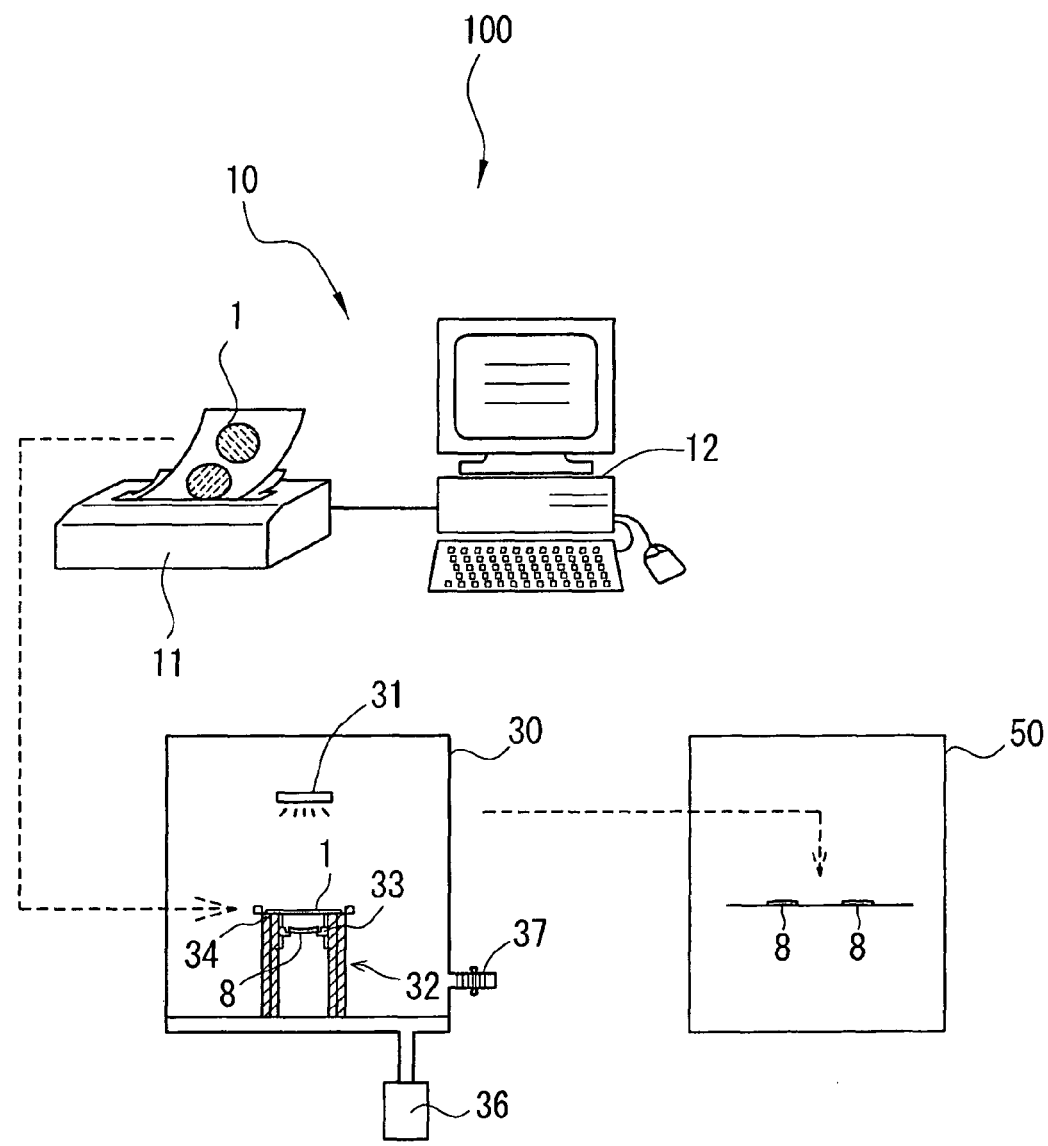
FIG. 1 is a schematic configuration view showing a dyeing system.

Referring to FIG. 1, a schematic configuration of a dyeing system 100 in the present embodiment will be first explained. The dyeing system 100 in this embodiment is provided with a dye attaching unit 10, a depositing unit 30, and a dye fixing unit 50.

[Dye Attaching Unit]

The dye attaching unit 10 is arranged to attach or adhere a sublimable dye to be deposited later on the plastic lens 8 to a dyeing base body 1, thereby forming a dye layer or layers 6 (see FIGS. 2A and 2B). The dyeing base body 1 is a medium which bears once the dye to be used for dyeing the plastic lens 8. The details of the dyeing base body 1 will be described later.

The dye attaching unit 10 in the present embodiment is configured to, as one example, attach (print in the present embodiment) liquid ink containing a sublimable dye to the dyeing base body 1 with use of an inkjet printer 11. Accordingly, the dye attaching unit 10 can attach a dye of the color desired by an operator more accurately to the dyeing base body 1. This unit 10 specifically enhances correctness of quantity, color tone, gradation level, and others of the dye to be attached to the dyeing base body 1. Further, the operator can easily handle dyes. Using the inkjet printer 11 makes it possible to reduce the quantity of dye to be used. In the present embodiment, a process of drying the ink printed by the inkjet printer 11 is performed, so that the dye is more firmly retained by the dyeing base body 1.

In the present embodiment, printing data used for driving control of the inkjet printer 11 is created by a personal computer (hereinafter, referred to as a "PC") 12. The operator can easily adjust color tone, intensity, brightness, presence/absence of gradation, and gradation level, and others of the dye(s) (ink(s)) to be adhered to the dyeing base body 1 by use of for example drawing software and others installed in the PC 12. The operator can also store printing data in a memory of the PC 12, a memory of the inkjet printer 11, a USB memory, and so on so that the same color inks can be repeatedly attached to a plurality of dyeing base bodies. The operator can also select one from a plurality of printing data created in advance by a maker or the like and operates the inkjet printer 11 to execute printing based on the selected data.

It is to be noted that attachment of dyes to the dyeing base body 1 can also be performed without using the inkjet printer 11. For instance, the dye attaching unit 10 may be configured to drive a dispenser (a liquid quantitative coating device), a roller, and others to attach ink(s) to the dyeing base body 1. Screen printing, offset printing, gravure printing, flexographic printing, and others may be adopted. The operator may also apply ink(s) to the dyeing base body 1 by using a brush(s), roller(s), and so on by himself.

In the present embodiment, at least three color dyes; red, blue, and yellow, are attached to the dyeing base body 1 by the inkjet printer 11. The dyes need to be sublimable and resistant to heat during sublimation. One example thereof in the present embodiment is a sublimable quinophthalone-based dye or a sublimable anthraquinone-based dye.

[Depositing Unit]

The depositing unit 30 is arranged to heat the dye attached to the dyeing base body 1 by electromagnetic waves, thereby causing sublimation of the dye toward the plastic lens 8. As a result, the dye is deposited to the plastic lens 8. The plastic lens 8 may have with various types of layers such as a dye acceptance layer to facilitate fixing of the dye in a fixing step mentioned later, and others. The depositing unit 30 in the present embodiment includes an electromagnetic wave generating part 31, a depositing jig 32, a pump 36, and a valve 37.

The electromagnetic wave generating part 31 is configured to generate electromagnetic waves to be absorbed by an electromagnetic wave absorption layer or layers 4 (see FIGS. 2A and 2B: mentioned later) of the dyeing base body 1. In the present embodiment, as one example, a halogen lamp that generates infrared light is used as the electromagnetic wave generating part 31. However, the electromagnetic wave generating part 31 has only to generate electromagnetic waves easily absorbable to the electromagnetic wave absorption layer(s) 4 described later. Accordingly, instead of the halogen lamp, any configuration that generates electromagnetic waves having other wavelengths such as ultraviolet light and microwave may be used. In the depositing unit 30, the electromagnetic waves are irradiated to the dyeing base body 1, thereby increasing the temperature of the dye in short time. To sublimate the dye on the dyeing base body 1, it is also conceivable to heat the dye by bringing an iron plate or the like heated to a high temperature into contact with the dyeing base body 1. However, it is difficult to bring the dyeing base body and the iron plate or the like into uniform contact (for example, without gaps) with each other. Unless the contact state is uniform, the dye is not uniformly heated, resulting in color unevenness and so on. On the other hand, the depositing unit 30 in the present embodiment enables uniform heating of the dye with the electromagnetic waves from the electromagnetic wave generating part 31 placed at a distance from the dyeing base body 1.

The depositing jig 32 is configured to hold the dyeing base body 1 and the plastic lens 8. This jig 32 in the present embodiment is provided with a lens supporting part 33 and a base body supporting part 34. The lens supporting part 33 includes a cylindrical base portion and a table placed inside the base portion. The plastic lens 8 is supported on the table of the lens supporting part 33 so that the lens 8 is surrounded by the base portion. The base body supporting part 34 is located at an upper end of the cylindrical base portion to support the dyeing base body 1 above the plastic lens 8. Even though the details are not illustrated, when an outer peripheral edge portion of the dyeing base body 1 is placed on the base body supporting part 34, an annular base-body retainer member is put from above on the outer peripheral edge portion of the dyeing base body 1. The position of the dyeing base body 1 is thus fixed. In a conventional art, a plate-like glass is put on an upper surface of the dyeing base body 1 held in the base body supporting part 34 in order to prevent sublimed dye from passing through the dyeing base body 1 to its back side and spreading over to thereby suppress the depositing unit 30 from getting dirty. However, in the present embodiment, even though the details will be described later, the sublimed dye is less likely to pass through the dyeing base body 1 to the back side. The depositing unit 30 is thus less likely to get dirty or be stained even without using the glass.

The dyeing base body 1 is placed so that a surface attached with the dye is opposed to the plastic lens 8. In the present embodiment, since the dyeing base body 1 is supported above the plastic lens 8, the dyeing base body 1 is disposed in the base body supporting part 34 so that the dye attached surface faces down. If a distance between the dye attached surface of the dyeing base body 1 and the plastic lens 8 is too narrow, the dye is not sufficiently sublimed, which is apt to cause color unevenness and others. The color unevenness and others may also be caused by contact between the dyeing base body 1 and the plastic lens 8. Furthermore, if the distance between the dye attached surface of the dyeing base body 1 and the plastic lens 8 is too large, the sublimed dye may collect again, leading to color unevenness, and the density of the dye to be deposited also becomes lower. It is accordingly preferable to set the distance between the dyeing base body 1 and the plastic lens 8 to an appropriate distance (e.g., 2 mm to 30 mm).

The pump 36 serves to exhaust air in the depositing unit 30 to the outside, thereby decreasing atmospheric pressure of the inside of the depositing unit 30. The internal atmospheric pressure of the depositing unit 30 during deposition is set to for example 30 Pa to 10 kPa, more preferably, in the order of 50 Pa to 500 Pa. The valve 37 serves to selectively open and close the internal space of the depositing unit 30.

[Dye Fixing Unit]

The dye fixing unit 50 is configured to heat the plastic lens 8 on which the dye has been deposited, thereby fixing the dye on the plastic lens 8. In the present embodiment, an oven is used as the dye fixing unit 50. Using the oven (particularly, a blower type constant temperature device) allows gradual increase of the temperature of the plastic lens 8 over a long time, so that the temperature difference is less likely to occur. Thus, the dye is easily uniformly fixed to the plastic lens 8.

It is to be noted that the configuration of the dye fixing unit 50 may be changed. For instance, the dye fixing unit 50 may be arranged to scan a laser over the plastic lens 8 to heat this lens 8. In this case, the dye fixing unit 50 may also be configured to intentionally cause a temperature difference between portions of the plastic lens 8. For instance, in a case of performing dyeing with gradation and so on, the dye fixing unit 50 may control the laser scanning according to a target gradation state. The dye fixing unit 50 may also control the laser scanning according to thickness and others of the plastic lens 8 so that the temperature of each portion of the plastic lens 8 becomes a desired temperature. Moreover, the dye fixing unit 50 may be arranged to directly irradiate electromagnetic waves to the plastic lens 8 to heat this lens 8.

Furthermore, two or more of steps to be executed in each of the dye attaching unit 10, the depositing unit 30, and the dye fixing unit 50 may be performed by a single unit. For example, a dyeing device may be used to carry out both a depositing step to be performed by the depositing unit 30 and the fixing step to be performed by the dye fixing unit 50. In this case, for example, heating the dyeing base body 1 in the depositing step and heating the plastic lens 8 in the fixing step may be conducted by the same heating means (e.g., an infrared heater, etc.). The dyeing device may be configured to automatically perform a sequence of a plurality of steps (e.g., the depositing step to the fixing step).

<Dyeing Base Body>

Figure 2A:
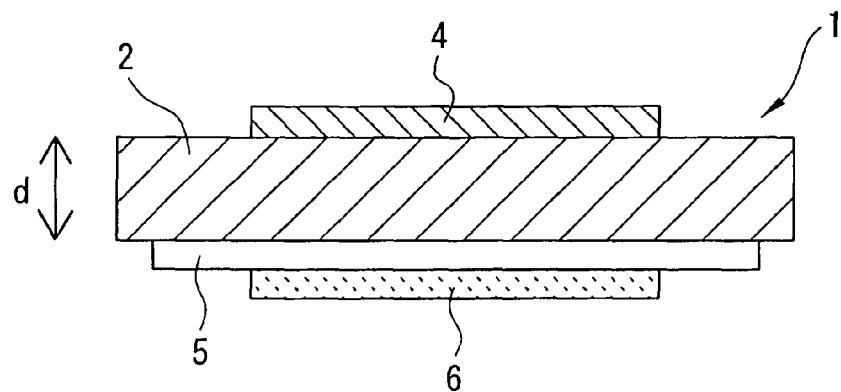
FIG. 2A is a front view of a dyeing base body.
Figure 2B:
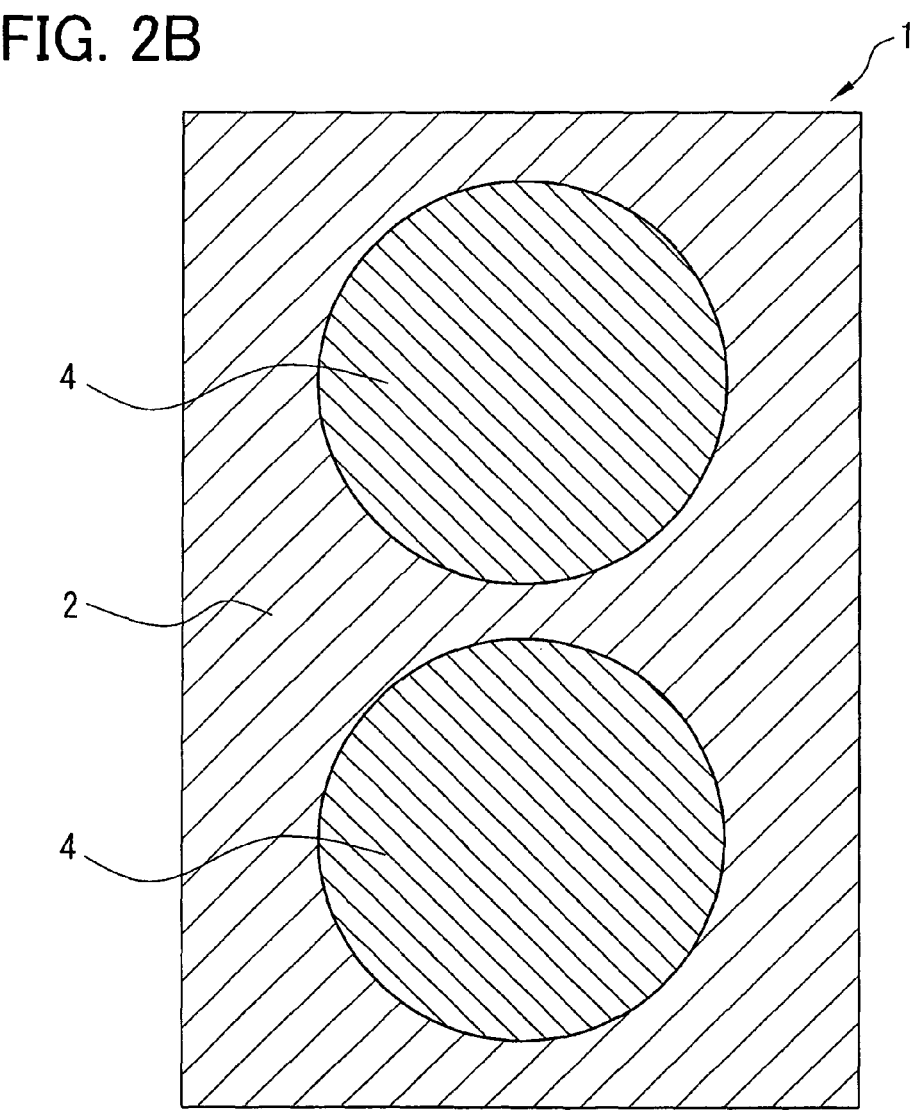
FIG. 2B is a plan view of the dyeing base body.

Referring to FIGS. 2A and 2B, the dyeing base body 1 in the present embodiment will be explained. FIG. 2A is a front view and FIG. 2B is a plan view. In FIG. 2A, for easy viewing of each layer, the length of the dyeing base body 1 in a thickness direction (an up-down direction in FIG. 2B) is illustrated longer than the actual length. The dyeing base body 1 exemplified in FIGS. 2A and 2B has already been applied with the dye formed into a dye layer or layers 6. However, the term "dyeing base body 1" used in this disclosure includes a dyeing base body 1 on which the dye layers 6 are not formed yet. The dyeing base body 1 in the present embodiment includes a base 2, the electromagnetic wave absorption layers 4, and a dye holding layer or layers 5, and the dye layers 6.

[Base]

The base 2 is a base material for holding other layers (the electromagnetic wave absorption layers 4 and others). This base 2 is made of metal in sheet form (e.g., deformable plate-like shape, plate-like shape having rigidity, etc.). Since the base 2 is made of metal, the sublimed dye is prevented from passing through the base 2 to its back side (an upper side in FIG. 2A). When the metal material forming the base 2 is a material with high heat conductivity, the time needed to increase the temperature of the dye in the depositing step can be shortened. In the present embodiment, aluminum high in heat conductivity, light in weight, and low in cost is used as the material of the base 2. However, another metal (e.g., iron) may be selected as the material of the base 2.

If the thickness d (the width in an up-down direction in FIG. 2A) of the base 2 is less than 1 µm, the strength of the base 2 is deteriorated. In this case, the dyeing base body 1 is difficult for an operator to handle. On the other hand, if the thickness d of the base 2 is larger than 1000 µm, its cost increases and also disposal is troublesome. The energy required to heat the dye (e.g., heating time and power) also increases. When the dyeing base body 1 is to be made disposable, in particular, the thickness d is preferably designed to be thinner. In the present embodiment, furthermore, the dye is attached to the base 2 by the inkjet printer 11. In this case, if the thickness d of the base 2 is 1000 µm or less, the base 2 is treated as with paper by the inkjet printer 11. As above, the thickness d of the base 2 is preferably 1 µm or more and 1000 µm or less. In the present embodiment, as one example, an aluminum foil having a thickness d of 11 µm is used as the base 2. In this case, it is easy to treat and dispose the dyeing base body 1. Even in the case where the dyeing base body 1 is disposable, its cost is low. Because of the small thickness d, furthermore, the base 2 can efficiently transfer heat from the electromagnetic wave absorption layers 4 to the dye layers 6 (mentioned later) in short time. However, the thickness d of the base 2 may also be changed. For instance, the thickness d may be set larger than 1000 µm to enable the dyeing base body 1 to be used in more than one dyeing step (that is, to enable reuse of the dyeing base body 1). In this case, if the dye is left on the dyeing base body 1 after termination of a last dyeing step, the operator is required to remove the remaining dye and perform a next dyeing step.

[Electromagnetic Wave Absorption Layer]

The electromagnetic wave absorption layers 4 are formed on at least the surface of the dyeing base body 1 on the opposite side (the upper side in FIG. 2A) to the surface attached with the dye. Each of the electromagnetic wave absorption layers 4 has a higher electromagnetic wave absorption rate than the base 2. In detail, the electromagnetic wave absorption layers 4 are required only to be able to absorb at least electromagnetic waves having a waveform generated by the electromagnetic wave generating part 31 at a higher absorption rate than the base 2. In the present embodiment, a halogen lamp that generates electromagnetic waves of visible range to near infrared range is used as the electromagnetic wave generating part 31. In the present embodiment, accordingly, a colored layer (in detail, a black or dark color layer) with a higher absorption rate of electromagnetic waves of visible range to near infrared range than the absorption rate of the base 2 is used as the electromagnetic wave absorption layers 4.

In the present embodiment, as one example, the electromagnetic wave absorption layers 4 are each formed of a dried coating with color ink containing heat resistant resin material (polyamide-imide resin in the present embodiment) and black or dark color (black in the present embodiment) pigment. In this case, the electromagnetic wave absorption layers 4 have sufficient heat resistance and suppress generation of corrugation of the base 2 made of an aluminum foil.

As a solvent for dissolving the resin, at least any one of ethanol, toluene, methyl ketone, dimethylacetamide, and others may be adopted. The method for attaching (applying) color ink onto the surface of the base 2 may be selected for example from gravure printing, screen printing, spraying, a method using a brush, a method using a roller, and others. It is to be noted that another material and another method may be used to form the electromagnetic wave absorption layers 4. For instance, when electromagnetic waves having another wavelength such as ultraviolet light are to be used, the electromagnetic wave absorption layers 4 have only to have the property of absorbing the electromagnetic waves having the selected wavelength.

As shown in FIGS. 2A and 2B, each electromagnetic wave absorption layer 4 in the present embodiment is formed in a region occupying a part of one surface of the dyeing base body 1. Thus, the cost of the dyeing base body 1 is lower than that when the electromagnetic wave absorption layers 4 are to be formed on both surfaces or when the electromagnetic wave absorption layer 4 is formed entirely over one surface. Each electromagnetic wave absorption layer 4 in the present embodiment is formed in a region covering the back side of a region formed with each dye layer 6 (the details thereof will be described later). In the present embodiment, each dye layer 6 is formed in a circular shape almost equal in size to the shape of the plastic lens 8. Thus, each of the electromagnetic wave absorption layers 4 is formed in a circular shape equal or almost equal in size to the dye layer 6 so as to cover the back side of the dye layer 6. In this case, the heat generated in the electromagnetic wave absorption layers 4 resulting from absorption of the electromagnetic wave is efficiently transferred to the corresponding dye layers 6. Of the dyeing base body 1, a portion not formed with the electromagnetic wave absorption layers 4 little absorbs the electromagnetic waves and hence the temperature of those layers 4 is less likely to rise. The operator is therefore allowed to easily treat the dyeing base body 1 by hands even immediately after termination of the depositing step.

The following assumes the case of forming an electromagnetic wave absorption layer on a base made of paper. In this case, the electromagnetic wave absorption layer also has an effect of suppressing the sublimed dye from striking or passing therethrough to the back side. Accordingly, in a case of placing significance on suppression of strike-through of the dye, it is preferable to form the electromagnetic wave absorption layer in a wide range. In the present embodiment, however, the base 2 is made of metal. It is thus possible to determine the region of each electromagnetic wave absorption layer 4 to be formed without taking into consideration the suppression of strike-through of the dye through each electromagnetic wave absorption layer 4. However, a portion to be formed with the electromagnetic wave absorption layer 4 may be appropriately changed. For instance, the electromagnetic wave absorption layer 4 can also be formed entirely over one surface of the dyeing base body 1. As another alternative, the electromagnetic wave absorption layer or layers 4 can also be formed on both surfaces of the base 2.

[Dye Holding Layer]

The dye holding layer(s) 5 is formed on the surface of the base 2, on which the dye is to be attached. In the case where the base 2 is made of metal, even when the liquid ink containing the dye is directly attached to the surface of the base 2, it is difficult to hold the dye contained in the ink due to ink blurring, ink spread, and others. If ink is attached or adhered to the dye holding layer 5, however, the dye in the ink is held in a stable state as compared with the case where the ink is directly attached to the surface of the base 2.

The material of the dye holding layer 5 may be selected from various materials. However, the present embodiment uses hydrophilic macromolecule material. In the present embodiment, particularly, in light of results of an evaluation test mentioned later, the hydrophilic macromolecule material including polyethylene oxide or polyethylene glycol is used as the material of the dye holding layer 5. In this case, the dyeing base body 1 can firmly hold the ink. Since the viscosity is decreased as the dye holding layer 5 is dried, furthermore, it is easier for the operator to handle the dyeing base body 1. The dye in the ink attached to the dye holding layer 5 is caused to sufficiently sublime when heated. Since the dye holding layer 5 is enough resistant to heat, the material of the dye holding layer 5 is less likely to cause sublimation or the like.

It has also been found that the materials other than polyethylene oxide and polyethylene glycol are usable for the dye holding layer 5. For example, in the case of using at least any one of polyvinyl pyrrolidone, polyvinyl alcohol, and copolymer of polyvinyl pyrrolidone and vinyl acetate, the dye is held in a stable state by the dye holding layer 5.

A region in which the dye holding layer 5 is formed has only to be a region including a region in which at least the dye layer 6 will be formed. In the present embodiment, on the assumption that a formation region of the dye layer 6 is displaced from a target position, a formation region of the dye holding layer 5 is designed to be slightly wider than the formation region of the dye layer 6. However, this formation region of the dye holding layer 5 may be appropriately changed. For instance, the dye holding layer 5 may be formed entirely over one surface of the base 2. Further, a layer serving as both the electromagnetic wave absorption layer 4 and the dye holding layer 5 may be formed on for example each surface of the base 2.

In the present embodiment, an intermediate layer (not shown) between the base 2 and the dye holding layer(s) 5 or the material of the dye holding layer(s) 5 includes a coloring material different in color from the base 2. Accordingly, the dye layer(s) 6 is formed on the coloring material. This allows the operator to appropriately ascertain an attaching state of the dye as compared with the case where the dye layer(s) 6 is formed on the metal base 2. It is to be noted that the present embodiment uses white coloring material to facilitate ascertainment of the dye attaching state. As an alternative, any other coloring material (e.g., milk white, black, etc.) other than white may also be used. The color of the coloring material may be selected according to the color of the dye layer 6 to be formed. Further, the "coloring material different in color from the base 2" includes a material of simply suppressing light reflection (reducing glazing) of the metal base 2. When the grazing is lower, an attaching state of the dye may be easily ascertained even in the same color.

[Dye Layer]

The dye layer 6 is a layer including a sublimable dye. In the present embodiment, as described above, coloring ink containing the sublimable dye is ejected onto the dye holding layer 5 by the inkjet printer 11. The ejected coloring ink is then dried, forming the dye layer 6.

<Method for Producing Dyeing Base Body Formed with Dye Layer>

One example of a method for producing the dyeing base body shown in FIGS. 2A and 2B will be explained. In the present embodiment, the method for producing the dyeing base body formed with the dye layers 6 includes an electromagnetic wave absorption layer forming step, a dye holding layer forming step, and a dye layer forming step.

The electromagnetic wave absorption layer forming step is a step of forming the electromagnetic wave absorption layers 4 on one surface of the metal base 2 made in sheet form. The dye holding layer forming step is a step of forming the dye holding layers 5 on an opposite side to the surface formed with the electromagnetic wave absorption layers 4. Either one of the electromagnetic wave absorption layer forming step and the dye holding layer forming step may be performed first. The dye layer forming step is a step of forming the dye layers 6 on the opposite side to the surface formed with the electromagnetic wave absorption layers 4. The dye layer forming step is executed after the electromagnetic wave absorption layer forming step and the dye holding layer forming step are performed. Accordingly, differently from the case where the dye layer forming step is performed first, it is possible to prevent generation of denaturation of the dye, unintended sublimation, smudge of the jig, and others by influence of heat and the like during other steps. Concrete methods for forming the electromagnetic wave absorption layers 4, the dye holding layers 5, and the dye layers 6 are as explained above. For instance, the dye layers 6 may be formed by use of the inkjet printer 11.

<Dyed Resin Body Producing Step>

Figure 3:
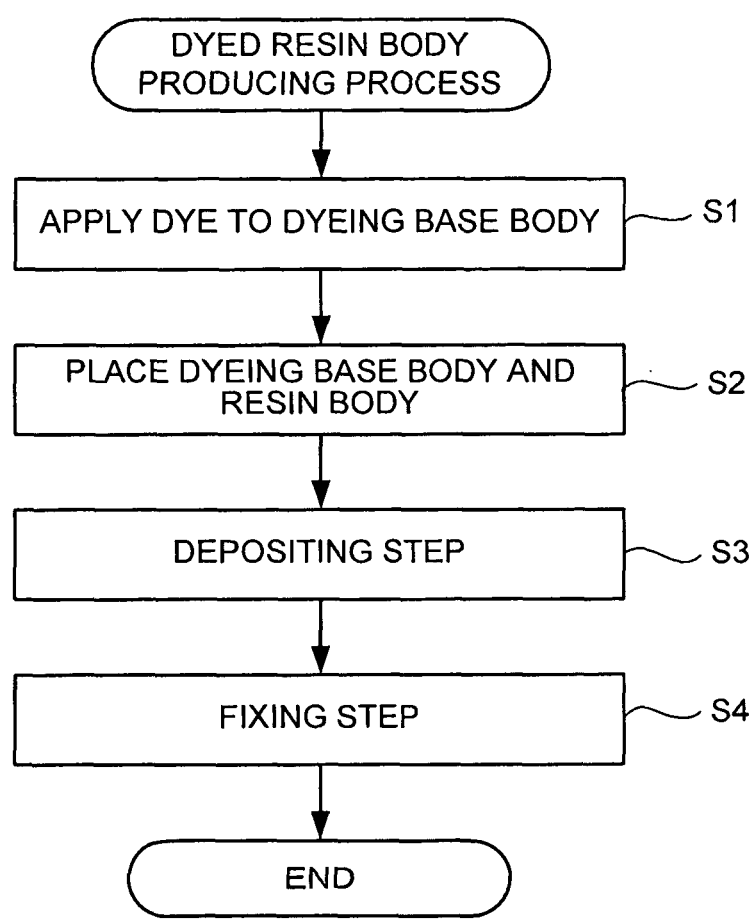
FIG. 3 is a flowchart showing a process of producing a dyed resin body.

Referring to FIG. 3, a step of producing a dyed resin body in the present embodiment will be explained. As one example, the producing step shown in FIG. 3 provides the case of producing a dyed resin body by use of the dyeing base body 1 on which the dye layers 6 are not formed yet. Firstly, the dye is attached (e.g., ink is applied and dried) to the dyeing base body 1 to form the dye layers 6 (S1). In the present embodiment, specifically, the inkjet printer 11 is driven according to data created by the PC 12 as described above, thereby applying ink of the color desired by the operator to the dyeing base body 1. The ink is applied on the dye holding layers 5 of the dyeing base body 1. This applied ink is dried and formed into the dye layers 6.

Subsequently, the dyeing base body 1 and the resin bodies (the plastic lenses 8) are placed in respective predetermined positions in the depositing unit 30 (S2). In the present embodiment, as described above, the dyeing base body 1 is disposed in the base body supporting part 34 and the plastic lenses 8 are set in the lens supporting part 33. Specifically, the dyeing base body 1 is placed so that the dye layers 6 are opposed to the plastic lenses 8.

The depositing step is successively performed (S3). In the depositing step in the present embodiment, the atmospheric pressure around the plastic lenses 8 and the dyeing base body 1 is lowered by the pump 36. The electromagnetic wave generating part 31 is then driven to irradiate electromagnetic waves to the electromagnetic wave absorption layers 4 of the dyeing base body 1. As a result, the temperature of the electromagnetic wave absorption layers 4 is raised and thus the heat is transferred to the dye layers 6, thereby sublimating the dye. The sublimed dye gets deposited on a surface of each plastic lens 8 opposed to the dyeing base body 1. Since this deposition is performed under vacuum or nearly vacuum, the generation of color unevenness in each plastic lens 8 is suppressed. It is to be noted that the surface of each plastic lens 8, on which the dye is deposited, may have a dye acceptance layer in advance as described above.

The fixing step is thereafter performed (S4). In the present embodiment, the dye fixing unit 50 heats the plastic lenses 8 under atmospheric pressure or nearly atmospheric pressure (the pressure may be pressurized to be higher than atmospheric pressure). This causes the dye to be fixed on the plastic lenses 8 while the deposited dye is suppressed from subliming again. Through the above steps, the dyed resin body is produced.

The above explained producing process is a mere example. Thus, a part of the process may be changed. For instance, as described above, the depositing step (S3) and the fixing step (S4) may be performed by the same device. Further, all the producing steps are not necessarily conducted by the same operator at the same place. For instance, a maker may perform the above step S1 and sell the dyeing base body 1 already formed with the dye layers 6. In this case, a user or buyer who buys the dyeing base body 1 will perform the above steps S2 to S4. The maker that produces the dyeing base body 1 may also sell a dyeing base body 1 on which the dye layers 6 are not formed yet. Of course, the maker may carry out the above producing steps in-house and sell a produced dyed resin body.

<Evaluation Test 1>

The inventor carried out an evaluation test to evaluate the effect resulting from that the dye holding layer 5 is provided on the dyeing base body 1 and the adequacy of the material of the dye holding layer 5. In this evaluation test, the inventor performed dyeing of six plastic lenses 8 by the method shown in the above embodiment by changing only the condition of the dye holding layer 5 (see FIGS. 2A and 2B) for each lens. Various conditions in the evaluation test are as follows. The following items (2) to (4) are common in the six tests. The printing condition (i.e., hue) of the dye (coloring ink) used in the inkjet printer 11 is also common in the tests.

(1) Condition of the dye holding layer 5

No. 1: No dye holding layer

No. 2: PEG (Polyethylene glycol) 1000 (9.7%-dilution with water)

No. 3: ND-1 by Dairiki Co., Ltd. (47.3%-dilution with water)

No. 4: PEO-1 by Sumitomo Seika Chemicals Co., Ltd. (9.9%-dilution with water)

No. 5: PEO-8 by Sumitomo Seika Chemicals Co., Ltd. (3.5%-dilution with water)

No. 6 (Comparative Example): Use of a conventional dyeing base body including paper as a base, No dye holding layer (2) Type of plastic lens 8: CR39 Plano-lens (3) Irradiation time of electromagnetic waves in the depositing step: 20 seconds (4) Heating temperature and time in the fixing step: 140° C., 90 minutes It is to be noted that PEO-1 and PEO-8 are both hydrophilic polymer (polyethylene oxide, polyethylene glycol); however, PEO-1 has a molecular weight of 150000 to 400000 and PEO-8 has a molecular weight of 1700000 to 2200000. The component of ND-1 is not disclosed. In the present evaluation test, any of the dye holding layers 5 was formed by applying respective materials to the bases 2 with brushes and drying them in an oven at 70° C. for 30 minutes.

FIG. 4 is a table showing evaluation results on the dyeing base bodies 1 before dyeing (i.e., before the depositing step). The inventor visually evaluated five dyeing base bodies 1 excepting the comparative example using the paper about the state of each dye holding layer 5 and the state of each dye attached onto the corresponding dye holding layers 5 by the inkjet printer 11 (i.e., the coloring ink state). In No. 1 (no holding layer), the coloring ink flowed, forming some liquid accumulated portions. In No. 2 (PEG1000), the material of the dye holding layer 5 was attached in the form of droplets in spots. This coloring ink attached to the dye holding layer 5 also flowed as in No. 1, forming some liquid accumulated portions. In No. 3 (ND-1), the dye holding layer 5 was finely applied. However, the coloring ink attached to the dye holding layer 5 partly blurred. In No. 4 (PEO-1), even though slight white linear unevenness came about in the dye holding layer 5, the dot shape of the coloring ink was substantially maintained. In No. 5 (PEO-8), more white linear unevenness was caused in the dye holding layer 5 than in No. 4 and the coloring ink more largely blurred than in No. 4. The above results reveal that the quality of the dye holding layer 5 in No. 4 is best.

Subsequently, the inventor evaluated the quantity of dyeing using the dyeing base bodies 1 in Nos. 3, 4, and 5 where the quality of each dye holding layer 5 was good and the quality of dyeing using the conventional dyeing base body 1 made of paper in the comparative example. The inventor first visually checked the dye state of the dyeing base bodies 1 after the depositing step. The dyeing base bodies 1 in No. 4 (PEO-1) and the No. 5 (PEO-8) were finely sublimed. In the dyeing base body 1 in No. 3 (ND-1), discolored black substances remained. This residual substance is conceived as some kind of substance that was carbonized. However, this discoloration is conceived as not having any influence on the dye quality (mentioned later) of the plastic lens 8.

FIG. 5 is a table showing evaluation results on the plastic lenses 8 after dyeing (i.e., after the depositing and fixing steps). The inventor evaluated the plastic lenses 8 dyed with use of the corresponding dyeing base bodies 1 in Nos. 3, 4, and 5 and the comparative example. Specifically, the inventor measured Tv (luminous transmittance) and L* value, a* value, and b* value (CIE chromaticity system) of each of the four plastic lenses 8 and visually evaluated those plastic lenses 8.

As shown in FIG. 5, the density of each of the plastic lenses 8 in Nos. 3, 4, and 5 each using the base 2 made of metal (aluminum in the present embodiment) is darker by about 6% than the density of the plastic lens 8 using the conventional dyeing base body 1 made of paper in the comparative example. In the dyeing step in Nos. 3, 4, and 5, different from the dyeing step in the comparative example, no dye was attached to a plate-like glass placed on an upper surface of each dyeing base body 1 (i.e., a surface opposite the dye layer 6). The reason thereof is because the metal bases 2 suppressed strike-through of the sublimed dye to the back side (i.e., the electromagnetic wave absorption layer 4 side).

In the visual evaluation, no color unevenness was found in any of the plastic lenses 8. Regarding the plastic lens 8 in No. 3, some substances were attached or stuck to the surface of the plastic lens, but they were removed by wiping the plastic lens with acetone. The substances are conceived as the sublimed substances contained in the material of the dye holding layer 5. Even in the plastic lens 8 in the comparative example, impure substances conceived as the substances contained in paper were somewhat attached to the surface of the lens. In the plastic lenses 8 in Nos. 4 and 5, it was confirmed that no substance was attached to the surface.

The above results of the evaluation test reveal that the dye quality is not deteriorated even by preparing the dyeing base body 1 with use of the metal base 2. Rather, the base 2 suppresses strike-through of the dye to the back side and enables an increase in dye density. Furthermore, it is also conceived that suppression of dye strike-through enables increasing the color reproducibility. It is further found that, as the material used for the dye holding layer 5, hydrophilic macromolecule material containing polyethylene oxide or polyethylene glycol can be adopted. However, even ND-1 could provide good dyeing quality itself.

<Evaluation Test 2>

The inventor performed another evaluation test to determine the adequacy of the material of the dye holding layer 5 that was a material (polyvinyl alcohol (PVA) or polyvinyl pyrrolidone (PVP)) different from the materials in <Evaluation Test 1>. In <Evaluation Test 2>, the inventor applied four materials listed below one each to the bases 2 by a bar-coat method and evaluated (1) the state of each dye holding layer 5, (2) the state of dye (i.e., the state of coloring ink) attached to each dye holding layer 5 by the inkjet printer 11, and (3) the quality after dyeing.

No. 7: PVA (10 wt %, average degree of polymerization=1500, layer thickness of dye holding layer 5=1.5 μm & 3.5 μm)

No. 8: PVP K25 (10 wt %, viscosity average molecular weight=25000, layer thickness of dye holding layer 5=2 to 3 μm)

No. 9: PVP K30 (10 wt %, viscosity average molecular weight=40000, layer thickness of dye holding layer 5=2 to 3 μm)

No. 10: PVP K90 (10 wt %, viscosity average molecular weight=630000, layer thickness of dye holding layer 5=2 to 3 μm & 5 to 8 μm)

(1) the State of Dye Holding Layer 5:
In all Nos. 7 to 10, the dye holding layers 5 were finely formed.

(2) the State of Dye Attached to Dye Holding Layer 5:
In Nos. 8 and 9, the coloring ink was partly repelled or blurred. On the other hand, in Nos. 7 and 10, the coloring ink was uniformly attached.

(3) Quality after Dyeing:
By checking the state of each dye holding layer 5 after the depositing step, crack generation was confirmed in the dye holding layers 5 in Nos. 8 and 9. When cracks are generated in the dye holding layer 5, unnecessary substances are likely to sublime together with the dye, leading to deterioration of dyeing quality. On the other hand, no crack was generated in Nos. 7 and 10.

(4) Conclusion:
The above results show that PVA and PVP are adoptable as the material of the dye holding layer 5 if only various conditions such as molecular weight are set appropriately.

<Comparison>

Comparison is given between the dyeing base body 1 in the present embodiment and the conventional dyeing base body. The conventional paper dyeing base body is easy to handle, low in cost, and high in absorption efficiency of electromagnetic waves as compared with the metal dyeing base body and others. However, a sublimable dye attached to one surface of the dyeing base body may strike through to an opposite surface. In this case, there is a possibility that the dyeing quality does not become constant and that stains stick to a jig and others. There is also a possibility that impure substance or fiber and others contained in paper sticks to a resin body, causing the need to clean the resin body or resulting in deterioration of dyeing quality. Further, in the conventional dyeing base body using inorganic material or metal material, the sublimable dye is unlikely to strike through to an opposite surface. The possibility of deteriorating the dyeing quality due to impure substances is also low. However, since the electromagnetic wave absorption rate is low, it is difficult to enhance the efficiency in heating the dye.

The dyeing base body 1 in the present embodiment includes the metal base 2 made in sheet form. On one surface of the base 2, the sublimable dye is attached. On the opposite surface to the dye attached surface, the electromagnetic wave absorption layer 4 having a higher electromagnetic wave absorption rate than the base 2 is formed. This reduces the possibility that the sublimable dye passes through to the opposite side of the base 2. Thus, there is little influence of the impure substances contained in the material of the base 2. Furthermore, the efficiency in heating the sublimable dye is increased. According to the present embodiment, therefore, both the quality and the efficiency of vapor deposition transfer dyeing are enhanced. In the present embodiment, the thickness of the base 2 is 1 μm or more and 1000 μm or less. In this case, the operator is allowed to efficiently perform the vapor deposition transfer dyeing.

When the ink (dye) is directly attached to the metal base 2, the ink is apt to blur and spread, and thus the ink is unlikely to be surely held. The dyeing base body 1 in the present embodiment including the dye holding layer 5 can enhance the dyeing quality and efficiency while stably holding the ink.

The dyeing base body 1 in the present embodiment includes a coloring material between the base 2 and the dye holding layer 5 or in the dye holding layer 5. In this case, the sublimable dye (the dye layer 6 in the present embodiment) is attached on or above the coloring material. Accordingly, the operator can appropriately ascertain the attaching state of the dye as compared with the case where the dye is attached on the color of the metal base 2.

The hydrophilic macromolecule material used for the dye holding layers 5 more preferably includes for example polyethylene oxide or polyethylene glycol. In this case, the dyeing base body 1 can firmly hold ink. As the ink is dried, its viscosity lowers, which makes easier to handle the dyeing base body 1 (for instance, a plurality of dyeing base bodies 1 may also be stacked). The dye in the ink attached to the dye holding layer 5 is sufficiently sublimed when heated. Furthermore, the dye holding layer 5 has sufficient heat resistance and thus the material of the dye holding layer 5 is less likely to sublime. As alternatives, any other material than polyethylene oxide and polyethylene glycol may be used. For example, the dye holding layer 5 may include at least any one of polyvinyl pyrrolidone, polyvinyl alcohol, and copolymer of polyvinyl pyrrolidone and vinyl acetate. Specifically, any hydrophilic macromolecule material may be used as long as it has hydrophilicity that causes no degradation or reaction at 250° C. or less and allows permeation of water-based ink and further has gaps (pores) through which the water-based ink is allowed to permeate therein.

The material of the electromagnetic wave absorption layers 4 in the present embodiment includes black or dark color pigment and heat-resistant resin material. In this case, the electromagnetic wave absorption layer that is unlikely to cause peel-off and thermal denaturation is easily formed. In the dyeing base body 1 in the present embodiment, particularly, polyamide imide resin which is heat resistant resin is used as the electromagnetic wave absorption layers 4. Accordingly, the dyeing base body 1 in the present embodiment has a high heat resistant temperature (about 275° C.) and high abrasion resistance and high slidability.

The region in which the electromagnetic wave absorption layer 4 is formed in the present embodiment is a region occupying a part of one surface of the dyeing base body 1 and a region covering the back side of the dye attached region (the region formed with the dye layer 6). This achieves a reduced cost as compared with the case where the electromagnetic wave absorption layer 4 is formed on the entire surface. A portion not formed with the electromagnetic wave absorption layer 4 is less likely to rise in temperature. This makes it easy for the operator to handle the dyeing base body 1 by hands even immediately after heating.

The content disclosed in the above embodiment is a mere example and thus may be changed or modified. The dyeing base body 1 in the above embodiment includes the base 2, the electromagnetic wave absorption layers 4, and the dye holding layers 5. However, the layer configuration of the dyeing base body 1 may be changed. For instance, in a case where the dye holding stability of the base 2 is not a large issue, the dye holding layers 5 may be omitted. The base 2 and the electromagnetic wave absorption layers 4 are not necessarily in direct contact with each other. That is, some layer may be interposed between the base 2 and the electromagnetic wave absorption layer 4. Similarly, any layer may be interposed between the base 2 and the dye holding layer(s) 5. Further, any layer may be provided to cover the surface of the dyeing base body 1 (e.g., to cover the surface of the electromagnetic wave absorption layers 4).

In the above embodiment, the dye holding layers 5 containing hydrophilic macromolecule material firmly hold the ink. However, the dye holding layers 5 to be provided may be formed of any other material than the hydrophilic macromolecule material. For instance, paper may be bonded to one surface of the metal base 2, so that this paper layer can be used as the dye holding layer 5. In the above embodiment, the material of the electromagnetic wave absorption layers 4 include pigments and heat resistant resin material. However, the material of the electromagnetic wave absorption layers 4 may be changed. For instance, the electromagnetic wave absorption layers 4 may be formed of heat resistant ink by a coloring spray.

What is claimed is:

1. A method for producing a dyed resin body, including:
    placing a dyeing base body comprising a surface on which a sublimable dye is attached under a vacuum, the dyeing base body including a metal base made in sheet form and an electromagnetic wave absorption layer having a higher electromagnetic wave absorption rate than the base;
    irradiating electromagnetic waves toward the electromagnetic wave absorption layer of the dyeing base body to heat the dye, thereby causing the dye to sublime and be deposited on a resin body that opposes the surface of the dyeing base body on which the dye is attached; and
    heating the resin body on which the dye has been deposited to fix the dye to the resin body.

2. A method for producing a dyeing base body, the method including:
    forming a dye layer containing a dye on a base body including a metal base made in sheet form and an electromagnetic wave absorption layer, the electromagnetic wave absorption layer having a higher electromagnetic wave absorption rate than the base,
    wherein the dye layer is formed on a surface of the base, and the electromagnetic wave absorption layer is disposed on at least a surface of the base that is opposite to the surface of the base on which the dye layer is formed.

3. A dyeing base body comprising:
    a metal base made in sheet form; and
    an electromagnetic wave absorption layer having a higher electromagnetic wave absorption rate than the base;

wherein:
a surface of the base is configured to hold a dye layer containing a sublimable dye;
the electromagnetic wave absorption layer is formed on at least a surface of the base that is opposite to the surface of the base that is configured to hold the dye layer; and
the dye is configured to be sublimed by heating via electromagnetic waves and deposited on a resin body.

4. A dyeing base body comprising:
a metal base made in sheet form;
an electromagnetic wave absorption layer having a higher electromagnetic wave absorption rate than the base; and
a dye holding layer configured to hold a sublimable dye and formed on a surface of the base;
wherein:
the electromagnetic wave absorption layer is formed on at least a surface of the base that is opposite to the surface of the base on which the dye holding layer is formed; and
the dye is configured to be sublimed by heating via electromagnetic waves and deposited on a resin body.

5. The dyeing base body according to claim 4, wherein the dye holding layer comprises a hydrophilic macromolecule material.

6. The dyeing base body according to claim 5, wherein the hydrophilic macromolecule material comprises at least one of polyethylene oxide, polyethylene glycol, polyvinyl pyrrolidone, polyvinyl alcohol, and a copolymer of polyvinyl pyrrolidone and vinyl acetate.

7. The dyeing base body according to claim 4, further comprising a coloring material; wherein:
the coloring material is in a layer interposed between the base and the dye holding layer, or is in the dye holding layer; and
the coloring material has a different color than the base.

8. The dyeing base body according to claim 4, wherein the base has a thickness of 1 μm or more and 1,000 μm or less.

9. The dyeing base body according to claim 4, wherein a material of the electromagnetic wave absorption layer comprises a black or dark color pigment and a heat resistant resin material.

10. The dyeing base body according to claim 4, wherein the electromagnetic wave absorption layer is formed in a region occupying a part of one surface of the dyeing base body and covering a back side of a region to which the dye is to be attached.

* * * * *